United States Patent
Miyoshi et al.

(10) Patent No.: US 7,013,908 B2
(45) Date of Patent: Mar. 21, 2006

(54) APPARATUS FOR INHIBITING FUEL FROM FLOWING OUT OF FUEL TANKS

(75) Inventors: Keiji Miyoshi, Aichi-ken (JP); Norihiro Yamada, Aichi-ken (JP); Keisuke Yoshida, Aichi-ken (JP); Tomohide Aoki, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 14 days.

(21) Appl. No.: 10/829,254

(22) Filed: Apr. 22, 2004

(65) Prior Publication Data
US 2004/0211465 A1    Oct. 28, 2004

(30) Foreign Application Priority Data
Apr. 25, 2003   (JP) .............................. 2003-121783

(51) Int. Cl.
*F16K 24/04*   (2006.01)
(52) U.S. Cl. ........................................ 137/202; 137/43
(58) Field of Classification Search ................. 137/43, 137/202
See application file for complete search history.

(56) References Cited

U.S. PATENT DOCUMENTS
2003/0098063 A1 *   5/2003   Mori et al. ................. 137/202

FOREIGN PATENT DOCUMENTS
| JP | A-2-112658 | 4/1990 |
| JP | A-11-229984 | 8/1999 |
| JP | A-2003-166449 | 6/2003 |

* cited by examiner

*Primary Examiner*—Kevin Lee
(74) *Attorney, Agent, or Firm*—Posz Law Group, PLC (57) ABSTRACT

An apparatus is for inhibiting fuels from flowing out of fuel tanks, and includes a cover, a breather pipe, an upper case, a lower case, and a floating valve. The upper case is welded to the breather pipe in an airtight manner so as to form a chamber for holding the lower case, in which the floating valve is accommodated, therein. Moreover, the breather pipe is welded to the cover in an airtight manner. The apparatus not only obviates O-rings but also is downsized, because the upper case and the breather pipe are sealed by welding.

9 Claims, 4 Drawing Sheets

APPARATUS FOR INHIBITING FUEL FROM FLOWING OUT OF FUEL TANKS

BACKGROUND OF THE INVENTION

1. Field of the Invention

The present invention relates to structural improvements on cut-off valves and means for detecting whether fuel tanks are filled up with fuels, cut-off valves and means which are disposed on automobile fuel tanks.

2. Description of the Related Art

In the vicinity of automobile fuel tanks, a vaporized-fuel circulating system, a so-called evaporator circuit, is disposed. The evaporator circuit leads vaporized fuels from fuel tanks to external canisters. The vaporized fuels are then adsorbed to activated carbon and the like, and are stored temporarily therein. Thus, the evaporator circuit inhibits the pressure increment within fuel tanks, pressure increment which results from the increment of vapor pressure. The canisters are connected with engines, and engines exert an inlet negative pressure to release the adsorbed vaporized fuels from activated carbon to mix them into an air-fuel mixture. Accordingly, the adsorbed vaporized fuels are used again as fuels.

The evaporator circuit is naturally provided with an opening, a so-called evaporator opening, which is formed in fuel tanks. The evaporator opening is generally formed at the uppermost portion of fuel tanks in order to inhibit liquid fuels from flowing into the evaporator circuit. However, when the level of liquid fuels move up and down, there might arise a fear that liquid fuels flow into the evaporator circuit through the evaporator opening. If liquid fuels flow even into the canister, they adsorb onto the activated carbon so that they might impair the usual vaporized fuel-adsorbing action of the activated carbon.

Hence, the evaporator opening has been conventionally provided with a variety of cut-off valves. As for the cut-off valves, floating valves have been often used as described later. When the level of liquid fuels rises abnormally, the floating valves float upward by buoyancy to close the evaporator opening. Consequently, the floating valves inhibit liquid fuels from flowing into the evaporator circuit.

Moreover, fuel tanks are provided with means for detecting whether fuel tanks are filled up with fuels when fuels are supplied. As for the means for detecting filled-up fuel tanks, apparatuses comprising a floating valve have been often used as described later. The floating valve closes an opening of fuel tanks to heighten the pressure within fuel tanks. Thus, fuel supply guns are turned off automatically.

For example, Japanese Unexamined Patent Publication (KOKAI) No. 11-229,984 discloses an apparatus for inhibiting fuels from flowing out. The flow-out fuel inhibitor apparatus is provided with a shut-off valve and a cut-off valve. The shut-off valve lets a gas, which includes a fuel vapor generating in a large volume, flow to a canister when a fuel is supplied. The cut-off valve lets a gas, which includes a fuel vapor, flow to a canister when a fuel is not supplied.

Figure 3:
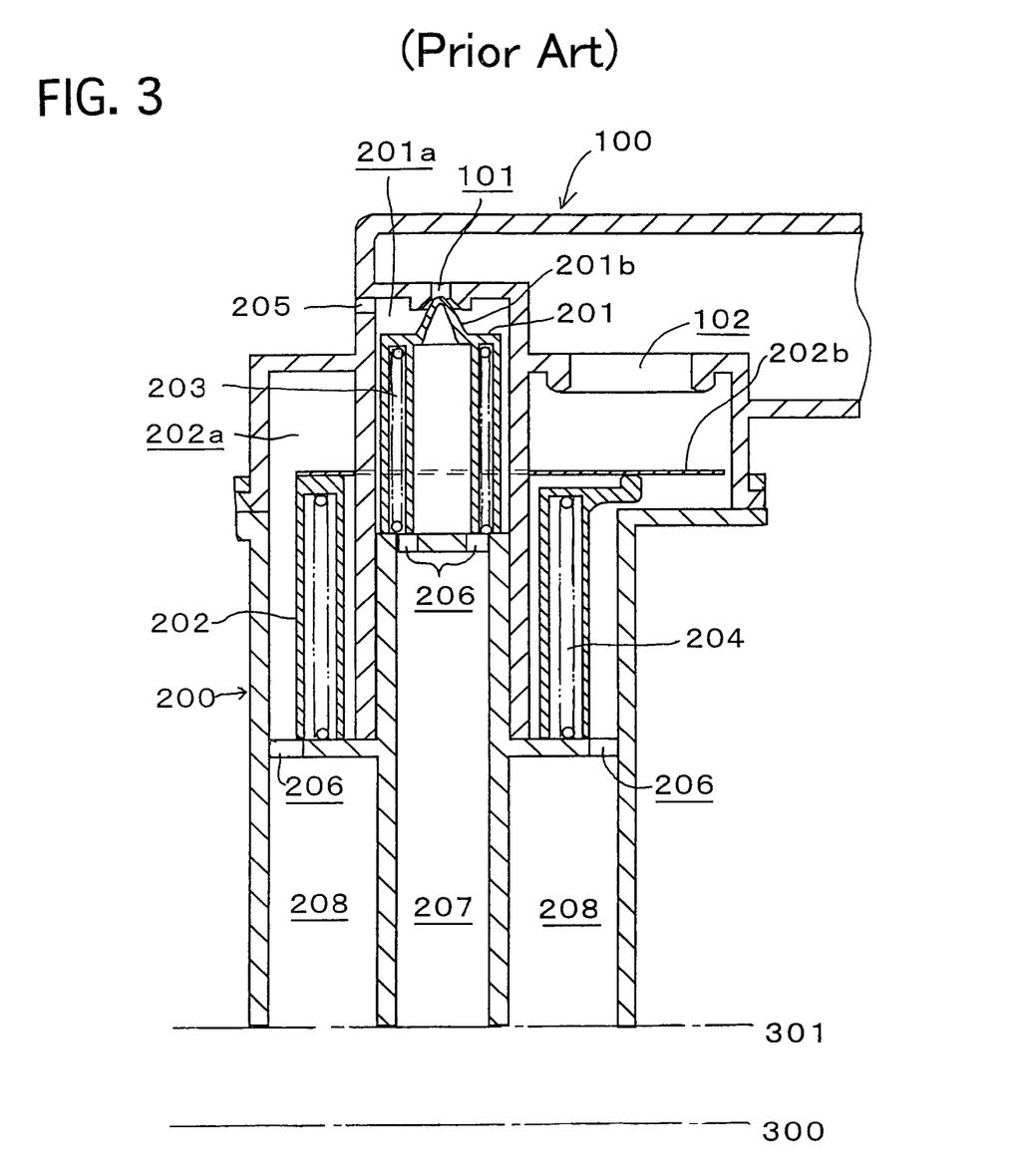
FIG. 3 is a cross-sectional view of a conventional flow-out fuel inhibitor apparatus.

The apparatus is disposed at the top in a fuel tank, and comprises an upper housing 100 and a lower housing 200 as illustrated in FIG. 3. The upper housing 100 is communicated with a not-shown canister. Moreover, the upper housing 100 and the lower housing 200 are communicated with each other by a minor-diameter first communication passage 101 and a major-diameter second communication passages 102.

A first float 201 and a second float 202 are disposed in the lower housing 200. The first float 201 is disposed in a cylinder-shaped first space 201a. The second float 202 is disposed in an annular second space 202a which is formed separately around the first space 201a. The second float 202 is formed as a cylinder shape.

The first float 201 and the second float 202 have a valve body 201b and a valve body 202b, respectively, at the top. The valve body 201b and the valve body 202b close the first communication passage 101 and the second communication passage 102, respectively, by the up-and-down movements of a level of liquid fuels. The first float 201 and the second float 202 are urged upward by a spring 203 and a spring 204, respectively. However, the valve body 201b or the valve body 202b keeps the first communication passage 101 or the second communication 102 open until liquid fuels float the first float 201 or the second float 202 upward.

Further, a minor hole 205 is formed at the top of the lower housing 200. The first space 201a is communicated with the vapor phase of fuel tanks by way of the minor hole 205. Furthermore, communication holes 206 are formed at the bottom of the first space 201a and the second space 202a. The first space 201a and the second space 202a are communicated with the inside of fuel tanks by way of the communication holes 206. Moreover, a central cylinder 207 and an annular cylinder 208 are formed in the lower housing 200. The central cylinder 207 extends downward under the first space 201a, and opens at the bottom end. The annular cylinder 208 is formed around the central cylinder 207, extends downward under the second space 202a, and opens at the bottom end.

The apparatus operates in the following manner. When fuels are supplied and the level of liquid fuels are at a position 300 disposed downward below the bottom end of the lower housing 200, vaporized fuels flow into the first space 201a and second space 202a by way of the communication holes 206, and flow into a canister through the upper housing 100 by way of the first communication passage 101 and second communication passage 102. Moreover, some of the vaporized fuels flow into the first space 201a by way of the minor hole 205, and flow into the canister through the upper housing 100 by way of the first communication passage 101. Thus, fuels are supplied smoothly without increasing the pressure within fuel tanks.

Moreover, after the level of liquid fuels reaches a position 301 disposed at the bottom end of the lower housing 200, the level of liquid fuels rises only in the annular cylinder 208, and liquid fuels flow into the second space 202a through the communication holes 206 to float the second float 202 upward, because the gaseous pressure in the central cylinder 207 is higher than the gaseous pressure within fuel tanks. When the second float 202 floats upward and the valve body 202b closes the second communication passage 102, the gaseous pressure within fuel tanks increases sharply, the automatic turning-off mechanism of fuel supply guns is actuated to stop supplying fuels. Thus, it is possible to detect whether fuel tanks are filled up with liquid fuels.

In addition, when the level of liquid fuels waves in driving, liquid fuels are inhibited from flowing into the upper housing 100, because the second float 202 floats upward to close the second communication passage 102 in the first place. Moreover, when the level of liquid fuels waves more violently, liquid fuels are further inhibited from flowing into the upper housing 100, because the first float 201 floats upward as well to close the first communication passage 101.

However, the above-described conventional apparatus is provided with the two float valves and two communication passages, respectively. Accordingly, the conventional apparatus suffers from a problem that it is difficult to design so as to operate each of them accurately. Moreover, the conventional apparatus is associated with the drawback of high cost, because it comprises a large number of component parts. In addition, there arises another problem that the disposition space is limited greatly, because it is required to enlarge the diameter of the second float 202 and the diameter of the second space 202a.

Moreover, it is necessary to manufacture a great number of the lower housings 200 and second floats 202 whose shapes are changed variously when the conventional apparatus is applied to fuel tanks whose shape and capacity differ with each other. Thus, the conventional apparatus suffers from a drawback that the man-hour requirement for the manufacture goes up remarkably.

Hence, the assignee of the present invention proposed a flow-out fuel inhibitor apparatus, which is provided with one and only floating valve to demonstrate both functions, the detection of filled-up fuel tanks and the cut-off valve, in Japanese Patent Application No. 2001-364,172. In accordance with the flow-out fuel inhibitor apparatus, it is possible not only to make the construction compact and share the component parts but also to achieve the reduction of cost and man-hour requirement, because the one and only floating valve demonstrates the two functions, the detection of filled-up fuel tanks and the cut-off valve.

Figure 4:
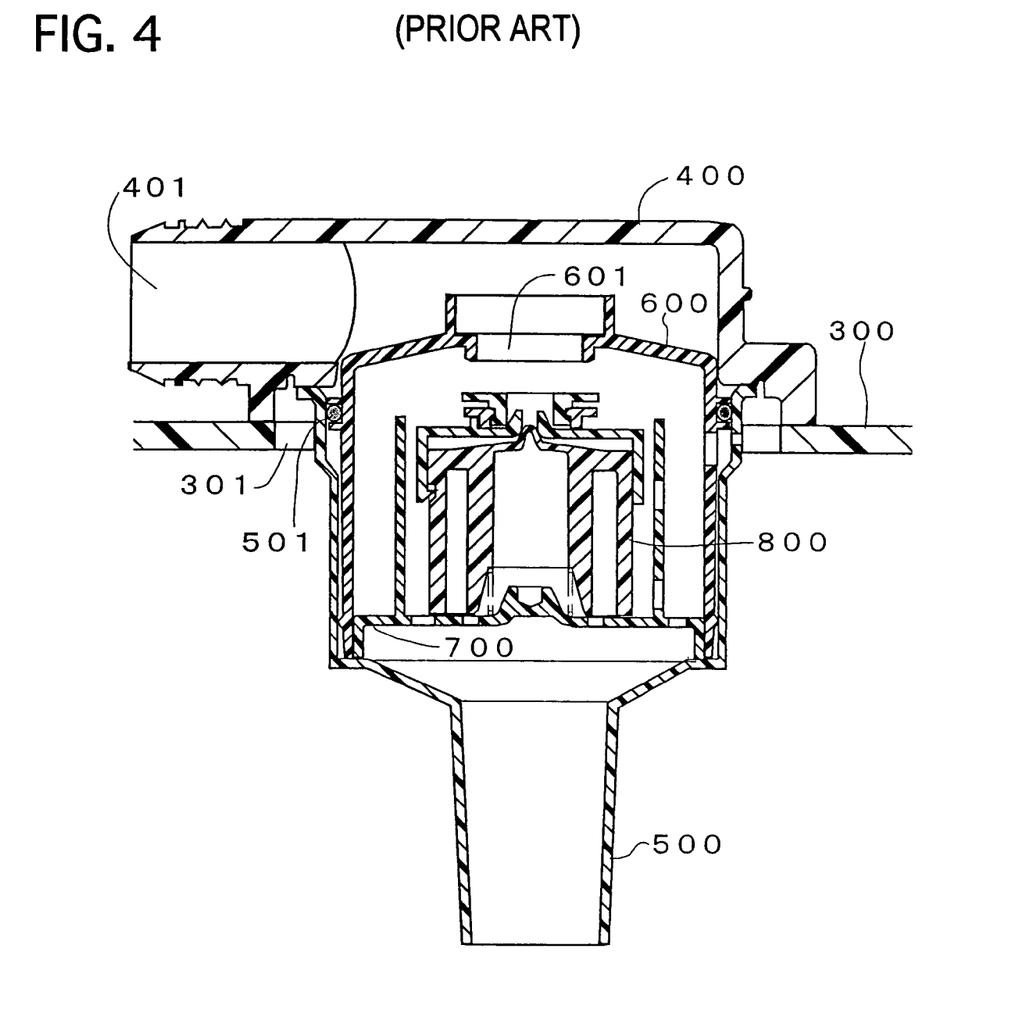
FIG. 4 is a cross-sectional view of a flow-out fuel inhibitor apparatus which is set forth in Japanese Patent Application No. 2001-346,172.

As illustrated in FIG. 4, the flow-out fuel inhibitor apparatus, an example set forth in the Japanese patent application, comprises a cover 400, a breather pipe 500, an upper case 600, a substantially box-shaped lower case 700, and one and only floating valve 800. The cover 400 is disposed outside a fuel tank 300 having a top opening 301, has a communication passage 401 communicating with a canister, and is welded to the periphery of the top opening 301 of the fuel tank 300 in an airtight manner. The breather pipe 500 is disposed inside the fuel tank 300, extends downward, and has a top-end opening whose periphery is welded to the cover 400 in an airtight manner. The upper case 600 is formed as an inverted bowl shape having a bottom at the top end, has a communication opening 601 in the bottom, the communication opening 601 communicating with the communication passage 401 of the cover 400, and a substantially cylinder-shaped wall extending downward and held to the breather pipe 500. The lower case 700 is fixed to the upper case 600. The floating valve 800 is accommodated in the lower case 700, floats on a liquid fuel, and moves up and down in accordance with the up-and-down movements of a level of the liquid fuel, whereby opening and closing the communication opening 601 of the upper case 600.

Moreover, an O-ring 501 is held between the upper case 600 and the breather pipe 500, because it is necessary to joint the upper case 600 with the breather pipe 500 in an airtight manner.

The flow-out fuel inhibitor apparatus is assembled in the following manner. First, the lower case 700 with the floating valve 800 accommodated therein is held by fitting into the upper case 600, and the O-ring 501 is disposed on the outer periphery of the upper case 600. The resulting sub-assembly is held by fitting into the breather pipe 500. Thereafter, the periphery of the top-end opening of the breather pipe 500 is fixed by welding to the cover 400 by means of a hot-plate welding method. The thus assembled flow-out fuel inhibitor apparatus is inserted into the top opening 301 of the fuel tank 300, beginning with the leading end of the breather pipe 500. Finally, the bottom end of the cover 400 is fixed by welding to the periphery of the top opening 301 of the fuel tank 300 to assemble the flow-out fuel inhibitor apparatus with the fuel tank 300.

However, when the flow-out fuel inhibitor apparatus is assembled while interposing the O-ring 501 between the upper case 600 and the breather pipe 500, it is not possible to say that the operation is easy. Actually, the man-hour requirement has gone up remarkably. Moreover, the O-ring 501 is swollen to certain extent by fuels. Accordingly, the O-ring 501 presses the breather pipe 500 outward diametrically when the expansion force is large. Therefore, the stress concentrates on the welded portion between the breather pipe 500 and the cover 400. Consequently, it is necessary to enhance the welding strength at the welded-portion. Because of this as well, the man-hour requirement has gone up sharply. Moreover, when the O-ring 501 contracts, there is another fear for a drawback that the sealing property might lower between the upper case 600 and the breather pipe 500.

Moreover, since the breather pipe 500 and the upper case 600 make a dual construction, the diameter of the breather pipe 500 is enlarged more than necessary. As a result, the flow-out fuel inhibitor apparatus might suffer from problems in view of the installation space and cost.

SUMMARY OF THE INVENTION

The present invention has been developed in view of such circumstances. It is therefore an object of the present invention to improve the flow-out fuel inhibitor apparatus set forth in Japanese Patent Application No. 2001-364,172. It is a further object of the present invention not only to make it possible to cut off liquid fuels and detect filled-up fuel tanks with a much more simplified arrangement, but also to downsize the flow-out fuel inhibitor apparatus without using an O-ring.

A flow-out fuel inhibitor apparatus according to the present invention can solve the aforementioned problems, and comprises:

a cover having a communication passage communicating with a canister, disposed outside a fuel tank having a top opening, and fixed to a periphery of the top opening of the fuel tank in an airtight manner;

a cylinder-shaped breather pipe disposed inside the fuel tank, extending downward, and having a top-end opening whose periphery is welded to the cover in an airtight manner;

an upper case having a communication opening communicating with the communication passage of the cover, and welded to the breather pipe in an airtight manner at an outer periphery of the communication opening in the vicinity of the top-end opening of the breather pipe;

a substantially box-shaped lower case disposed in the breather pipe, having a top end held to the upper case, and enabling a liquid fuel to pass through the inside and outside thereof; and a floating valve accommodated in a housing formed by the upper case and the lower case, floating on the liquid fuel, and moving up and down in accordance with the up-and-down movements of a level of the liquid fuel, whereby opening and closing the communication opening of the upper case.

Moreover, the top-end opening of the breather pipe can preferably have a flange., and the top end of the lower case can desirably be held between the upper case and the flange of the breather pipe.

Thus, in accordance with the present flow-out fuel inhibitor apparatus, it is possible to cut off liquid fuels and detect filled-up fuel tanks by the arrangement which is much simpler than that of the flow-out fuel inhibitor apparatus set forth in Japanese Patent Application No. 2001-364,172. Moreover, it is possible to downsize the structure without using any O-ring. Therefore, it is possible to avoid the drawbacks resulting from expanded O-rings. In addition, it is possible to obviate the dual structure set forth in Japanese Patent Application No. 2001-346,172, because the upper case is welded adjacent to the top-end opening of the breather pipe. As a result, it is possible to make the size much more compact.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

In the present flow-out fuel inhibitor apparatus, welding is used as means for fastening the upper case and the breather pipe, instead of O-rings. Therefore, it is possible to avoid the drawback resulting from the expansion of O-rings. Moreover, no wall of the upper case is intervened between the breather pipe and the lower case, because the upper case is welded adjacent to the top-end opening of the breather pipe. Hence, the dual structure set forth in Japanese Patent Application No. 2001-346,172 has been obviated, and accordingly it is possible to make the overall size much more compact.

Further, as a structure for holding the lower case to the upper case, a noble structure is employed in which the top end of the lower case is held to the upper case. Therefore, even when vibrations or shocks are applied to the present flow-out fuel inhibitor apparatus, the present flow-out fuel inhibitor apparatus can have the floating valve show its functions stably, because the lower case is less likely to deviate axially.

Furthermore, in the present flow-out fuel inhibitor apparatus, the floating valve is supported in the lower case by its own weight in the same manner as the flow-out fuel inhibitor apparatus set forth in Japanese Patent Application No. 2001-346,172 to open the communication opening to canisters when the level of liquid fuels is placed below the breather pipe under normal operating circumstances. Therefore, gases within fuel tanks pass the lower case through the breather pipe, and flow into canisters through the communication opening. Thus, the gaseous pressure within fuel tanks can be adjusted.

Moreover, when the level of liquid fuels within fuel tanks rises to arrive at the bottom-end opening of the breather pipe under fuel supply circumstances, gases within fuel tanks cannot go anywhere so that the gaseous pressure within fuel tanks increases instantaneously. Thus, the present flow-out fuel inhibitor apparatus can promote to automatically turn off fuel supply guns. Specifically, it is possible to detect whether fuel tanks are filled up with liquid fuels with the breather pipe. As a result, it is possible to adjust the level of liquid fuels which tells the position for detecting filled-up fuel tanks by simply adjusting the length of the breather pipe.

In addition, when the level of liquid fuels rises abnormally to float the floating valve upward upon accelerating vehicle in driving, the floating valve is pressed onto the communication opening of the upper case by the buoyancy, thereby closing the communication passage communicating with canisters. Thus, liquid fuels are inhibited from entering the communication opening and then flowing into canisters. Hence, the floating valve serves as a cut-off valve.

The fuel tank can be fuel tanks made of metals, or fuel tanks made of resins, such as PE, which are good in terms of the fuel resistance. The cover can be fastened mechanically to the periphery of the top opening of the fuel tank while intervening a packing between them. Alternatively, it is preferable to weld the cover with the fuel tank. Note that the top opening can desirably be formed in the top surface of the fuel tank. However, depending on specific cases, the top opening can be formed at the top in one of the side surfaces of the fuel tank.

The cover is disposed outside the fuel tank, and has the communication passage communicating with a canister. When the cover is fixed by welding to the fuel tank, it is desirable to form at least the surface of the cover, which is to be welded to the fuel tank, of resins whose material quality is the same as that of the fuel tank. Moreover, it is desirable to form the surface of the cover, which is to be welded to the breather pipe, of resins whose material quality is the same as that of the breather pipe, because the breather pipe is welded to the cover. However, since there might arise cases where the moldability of resinous materials is poor, it is necessary to design elaborately so as to form the inner periphery of the cover of resins which are of good moldability and form the outer periphery of the cover of weldable resins. Note that the cover can be welded to the breather pipe by hot-plate welding, vibration welding, and laser welding.

The breather pipe is disposed inside the fuel tank so that the periphery of the top-end opening is welded to the cover in an airtight manner. The breather pipe is designed so that the bottom-end opening is positioned at the level of liquid fuels at which fuel tanks are filled up with the liquid fuels. Accordingly, the length of the breather pipe differs variously depending on the capacity and shape of fuel tanks. However, in accordance with the present flow-out fuel inhibitor apparatus, it is possible to detect whether fuel tanks are filled up with liquid fuels by simply adjusting the length of the breather pipe. Consequently, when the breather pipe is formed to a maximum length, it is possible to define the position of the level of liquid fuels at which fuel tanks are filled up with the fuels by simply cutting the breather pipe to a desired length according to specific vehicles. As a result, it is not required to manufacture a variety of flow-out fuel inhibitor apparatuses according to fuel tanks, but it is possible for various fuel tanks to share the present flow-out fuel inhibitor apparatus. Thus, it is possible to sharply reduce the man-hour requirement for the manufacture of fuel tank assemblies. Moreover, it is advisable to prepare a plurality of the breather pipes which have a desired length.

The breather pipe can desirably have an inside diameter at a bottom-end opening thereof at least, the inside diameter being smaller than that of the top-end opening. With this arrangement, liquid fuels are less likely to enter into the breather pipe. Hence, it is possible to inhibit liquid fuels from entering canisters when the level of liquid fuels waves. Moreover, it is possible to improve the accuracy in detecting filled-up fuel tanks.

Moreover, the breather pipe can desirably have a differential valve member at the top. The differential valve member is capable of introducing gases within fuel tanks into the breather pipe when a pressure within fuel tanks is increased abnormally after the level of liquid fuels is disposed at the bottom-end opening of the breather pipe or higher. The differential valve member makes it possible to supply liquid fuels excessively. Moreover, differential valve member makes it possible to inhibit the pressure within fuel tanks from increasing abnormally.

The differential valve member can be through holes whose diameter is small, for instance. It is important to appropriately design the diameter and quantity of the through holes. When the diameter of the through holes is too large, or when the quantity of the through holes is too much, it is difficult to increase the inner pressure within fuel tanks when the fuel tanks are filled up with liquid fuels. Accordingly, it is difficult to automatically turn off fuel supply guns. On the other hand, when the diameter of the through holes is too small, or when the quantity of the through holes is too few, it is difficult to distribute gases within fuel tanks to canisters. Consequently, a drawback might arise to adversely affect when the floating valve serves as a cutoff valve to adjust the inner pressure within fuel tanks. Therefore, it is necessary to determine the diameter and quantity of the through holes by trial and error but precisely depending on the capacity of fuel tanks. Note that it is desirable to dispose the through holes as close as possible to the top surface of fuel tanks in order to inhibit liquid fuels from coming into the breather pipe through the through holes.

Moreover, the differential valve member can be a relief valve which is opened by a predetermined pressure or more. When starting supplying liquid fuels through a filler pipe to fuel tanks in which liquid fuels are held less, the level of liquid fuels rises gradually from the bottom of fuel tanks. Accompanied by the rise, the vapor-phase volume within fuel tanks diminishes. However, the vapor-phase pressure hardly increases, because gases in the vapor phase flow into canisters from the breather pipe through the communication opening of the upper case. Accordingly, it is possible to supply liquid fuels smoothly.

When liquid fuels are kept to be supplied and the level of liquid fuels are positioned as high as at the bottom-end opening of the breather pipe, the escape route of gases has been narrowed so that liquid fuels are sucked up by the increasing pressure of gases into the breather pipe to raise the floating valve. Accordingly, the floating valve closes the communication opening of the upper case. Consequently, gases have lost their way out so that the vapor-phase pressure increases. When the vapor-phase pressure is a first predetermined pressure or more, an automatic stopper mechanism for automatically turning off fuel supply guns is actuated to automatically terminate the supply of liquid fuels.

Thereafter, liquid fuels are generally supplied excessively until the level of liquid fuels rises in a filler pipe. In this instance, the differential valve member or relief valve is designed so that it opens when the vapor-phase pressure increases to a second predetermined pressure which is beyond the first predetermined pressure. For example, when the second predetermined pressure is set to be the sum of P1 and P2 (i.e., P1+P2) or more wherein P1 is the vapor-phase pressure within fuel tanks filled up with liquid fuels to the designated capacity; and P2 is a pressure equivalent to the difference between the height of the level of liquid fuels within fuel tanks and the height of the level of liquid fuels within a filler pipe, the level of liquid fuels rises within the filler pipe, and thereby it is difficult to supply liquid fuels excessively more than the designated capacity. Therefore, it is possible to always fill up fuel tanks with liquid fuels to the designated capacity without supplying liquid fuels excessively thereafter. Thus, it is not necessary to excessively supply liquid fuels a couple of times.

Moreover, when the vapor-phase pressure within fuel tanks rises beyond the second predetermined pressure, the differential valve member or relief valve opens to communicate the vapor phase with the breather pipe and canisters by way of the differential valve member or relief valve. Accordingly, it is possible to decrease the vapor-phase pressure. In addition, it is possible to inhibit liquid fuels from blowing back when supplying liquid fuels. Consequently, it is possible to secure safety when supplying liquid fuels.

The upper case has the communication opening communicating with the communication passage of the cover, and is welded to the breather pipe in an airtight manner at an outer periphery of the communication opening in the vicinity of the top-end opening of the breather pipe. Therefore, the upper case and the breather pipe form an airtight cylinder-shaped body in which only the communication opening opens at one of the opposite ends and only the bottom-end opening of the breather pipe opens at the other one of the opposite ends. The upper case can be welded to the breather pipe by hot-plate welding, vibration welding, and laser welding.

The lower case is held to the upper case at the top end, and is disposed in the breather pipe. The lower case has a function of holding the floating valve from down below. In order to enable the floating valve to float upward by liquid fuels, the lower case is constructed so as to enable liquid fuels to pass through the inside and outside thereof. For example, the lower case can be formed as frame shapes, or can be formed as bottomed cylinder shapes which are provided with a plurality of through holes in the wall surface.

The lower case is held to the upper case at the top end. Accordingly, even when vibrations and shocks are applied to the present flow-out fuel inhibitor apparatus, it is possible to reveal the functions of the floating valve stably because the lower case is less likely to deviate axially. The lower case can be held to the upper case mechanically by engaging with claws or fitting, or can be welded thereto. However, it is preferable to hold the lower case to the upper case in mechanical manners which offer easy assemblage, because no sealability is required between them.

Moreover, it is preferable to form a flange at the top-end opening of the breather pipe and to hold the top end of the lower case between the upper case and the flange of the breather pipe. With such an arrangement, it is possible to securely hold the lower case, and accordingly it is possible to securely inhibit the lower case from deviating axially even when excessive shocks act on the present flow-out fuel inhibitor apparatus under shipment.

The floating valve is accommodated in a housing formed by the upper case and the lower case, floats on liquid fuels, and moves up and down in accordance with the up-and-down movements of the level of liquid fuels, whereby opening and closing the communication opening of the upper case. The floating valve can be made from the same materials as conventional floating valves are made from, and can be formed as the same shapes as they are formed. Moreover, the floating valve can float upward by the difference between its specific gravity and the gravity of liquid fuels alone. Alternatively, the floating valve can use the urging force of urging means, such as springs, as an aid for the buoyancy.

In addition, the floating valve can desirably be constructed as a dual construction comprising an internal sealing member which is held to a floating valve movably in the up and down directions, for example, as set forth in Japanese Unexamined Patent Publication (KOKAI) No. 2-112,658. When the floating valve is thus constructed, it is possible to inhibit such a drawback that the floating valve adheres to the communication opening of the upper case so that the floating valve does not descend even when the level of liquid fuels moves downward. Accordingly, the floating valve is improved in terms of the dynamic sealing ability when the level of liquid fuels waves violently. Consequently, the floating valve can operate as a cut-off valve more effectively.

EXAMPLE

The present invention will be hereinafter described in more detail with reference to a specific embodiment.

Figure 1:
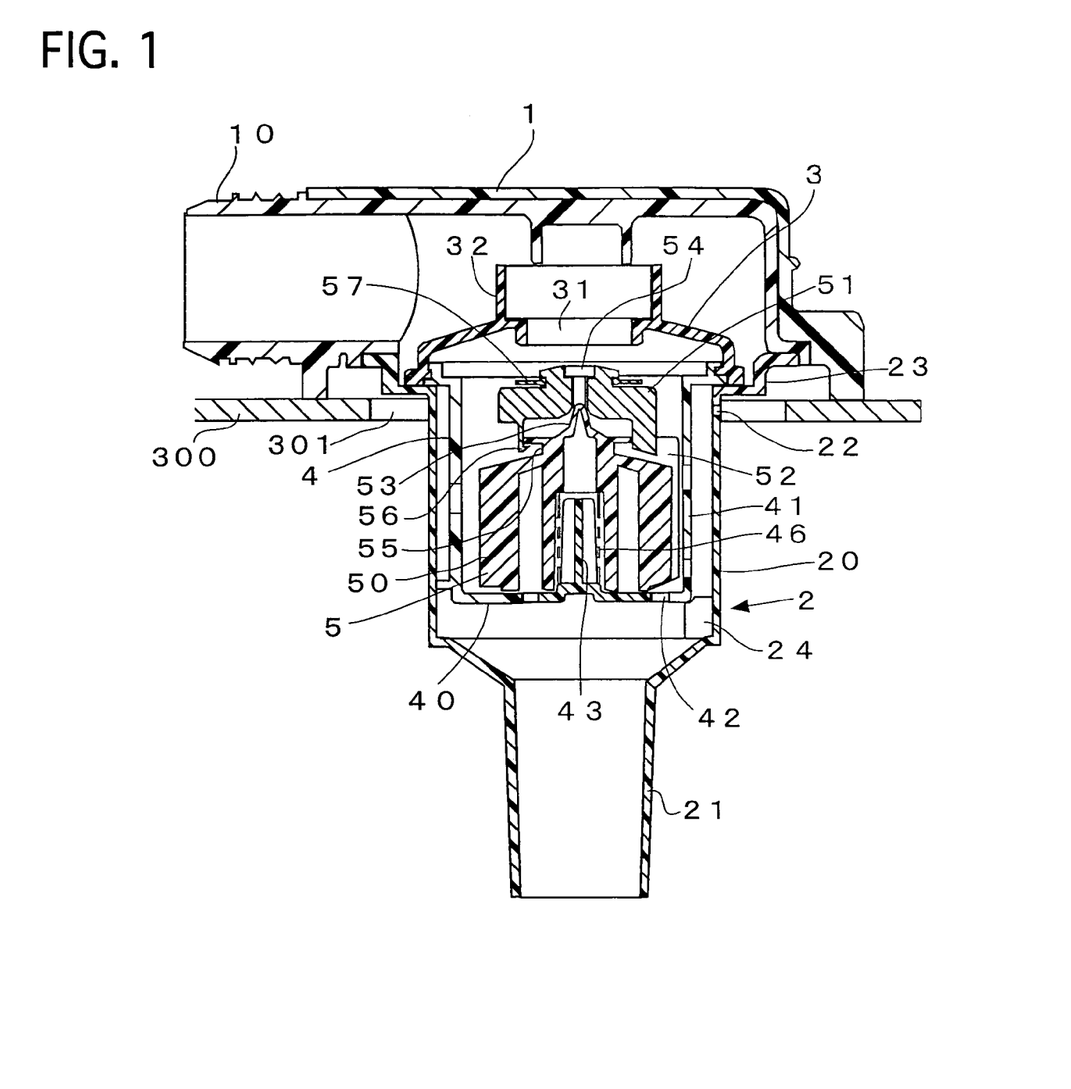
FIG. 1 is a cross-sectional view of a flow-out fuel inhibitor apparatus according to Example No. 1 of the present invention.

FIG. 1 illustrates a cross-sectional view of a flow-out fuel inhibitor apparatus according to Example No. 1 of the present invention. The flow-out fuel inhibitor apparatus comprises a cover 1, a breather pipe 2, an upper case 3, a lower case 4, and a double-floating valve 5. The cover 1 is fixed by welding over a top opening 301 which is formed in the top surface of an automotive fuel tank 300 made from resin. The breather pipe 2 is fixed by welding to the bottom surface of the cover 1. The upper case 3 is fixed by welding to the breather pipe 2. The lower case 4 is held by fitting to the upper case 3, and is disposed in the breather pipe 2. The double-floating valve 5 is disposed movably up and down in the upper case 3 and lower case 4.

The cover 1 is formed of acid-modified polyethylene resin and carbon black-containing polyamide resin by two-color molding. After the outer layer is molded with the acid-modified polyethylene resin, the inner layer is injection molded with the polyamide resin. In this instance, the acid-modified polyethylene resin and the polyamide resin are bonded chemically by the heat of the molten polyamide resin, thereby forming the cover 1 with a two-layered construction. Moreover, the outer acid-modified polyethylene resin is fixed by welding to the top surface of the fuel tank 300. In addition, the cover 1 is provided with a nipple 10 (i.e., a communication passage). The nipple 10 is fitted into a tube (not shown) communicating with a canister, and is protruded parallel to the top surface of the fuel tank 300.

The breather pipe 2 is formed of glass fiber-reinforced polyamide resin by injection molding, and is molded as a two-staged construction which comprises a major-diameter portion 20 and a minor-diameter portion 21. The end surface of the major-diameter portion 20 is fixed by welding to the bottom surface of the cover 1. On the other hand, the minor-diameter portion 21 extends substantially vertically toward the inside of the fuel tank 300, and is formed to a length so that the end surface of the bottom-end opening is positioned at the level of the liquid fuel when the fuel tank 300 is filled up with the liquid fuel nominally. Moreover, in the side wall of the major-diameter portion 20, minor-diameter through holes 22 are formed at positions substantially equal to the uppermost position of the fuel tank 300. Accordingly, the inside of the breather pipe 2 is communicated with the vapor phase within the fuel tank 300 by the through holes 22.

The upper case 3 is molded as an inverted bowl shape, and is formed of carbon black-containing polyamide resin. At the end of the major-diameter portion 20 of the breather pipe 2, a flange 23 is formed. The upper case 3 is welded to the flange 23 at the entire periphery of the bottom end. Moreover, at the uppermost portion of the lower case 3, an evaporator opening 31 (i.e., a communication opening) is formed which communicates with the cover 1. In addition, around the evaporator opening 31, a cylinder-shaped liquid reservoir 32 is formed which is erected upward.

The lower case 4 is formed substantially as a bottomed cylinder shape, which comprises a seat 40 and a cylinder 41 extending upward from the seat 40. The top end of the cylinder 41 is fixed by engagement to the upper case 3. The seat 40 is brought into contact with a protrusion 24 which is formed on the inner peripheral surface of the breather pipe 2, and is thereby held in the breather pipe 2. Moreover, in the seat 40 and cylinder 41, a plurality of through holes 42 are formed which penetrate the inside and outside. In addition, at the middle of the seat 40, a protrusion 43 is formed to protrude upward.

Figure 2:
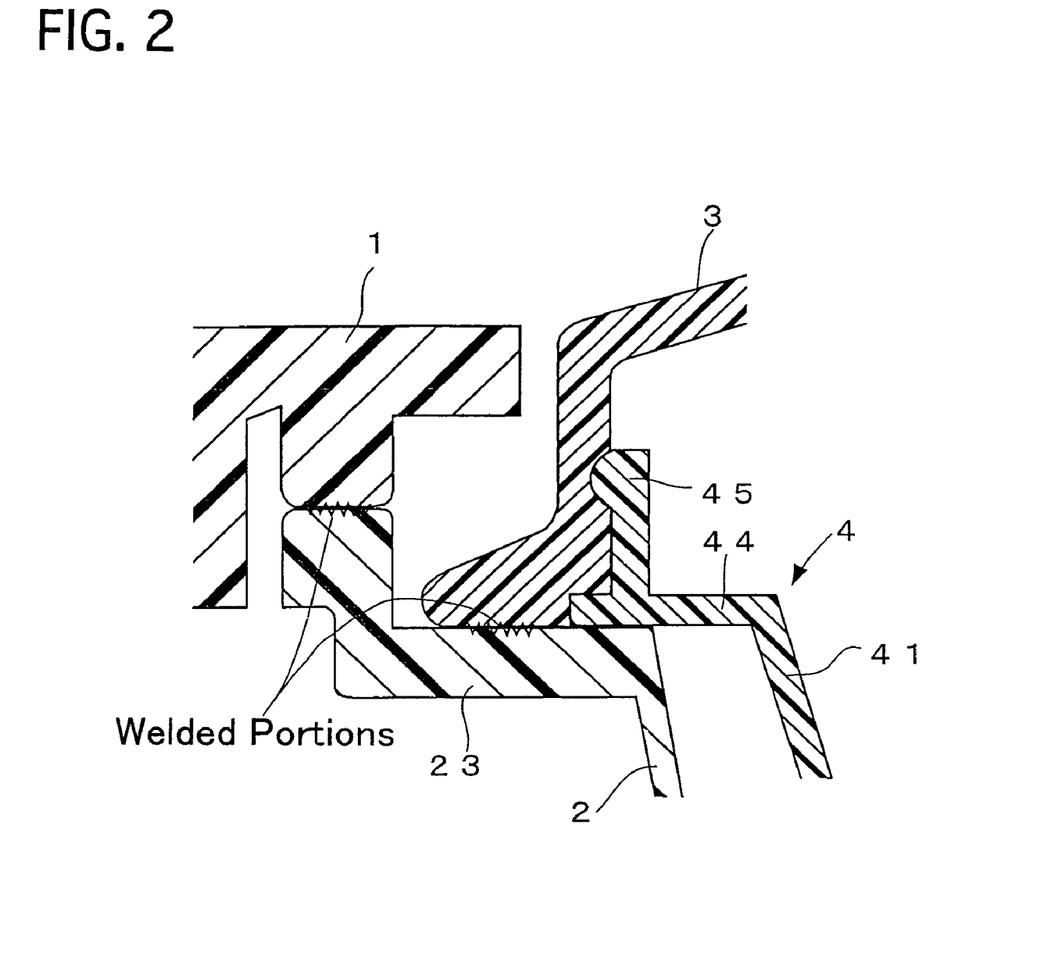
FIG. 2 is an enlarged cross-sectional view of a major portion of the flow-out fuel inhibitor apparatus according to Example No. 1.

As illustrated in FIG. 2, a flange 44 and a plurality of claws 45 extending upward from the flange 44 are formed at the top end of the cylinder 41. The claws 45 are held by engagement to the periphery of the upper case 3. Moreover, the leading end of the flange 44 is held between the upper case 3 and the flange 23 of the breather pipe 2. Thus, the lower case 4 is held and fixed firmly in the major-diameter portion 20 of the breather pipe 2, and is thereby inhibited from deviating axially even when large shocks are applied to the flow-out fuel inhibitor apparatus according to Example No. 1 of the present invention.

As illustrated in FIG. 1, in the cylinder 41 of the lower case 4 which is formed of polyoxymethylene (POM) resin, the double-floating valve 5 is accommodated so that it is placed on the seat 40. The double-floating valve 5 comprises a lower float 50, and an upper float 51. The lower float 50 is accommodated in the cylinder 41 by way of a spring 46 which is held to the protrusion 43 at one of the opposite ends. On the outer peripheral surface of the lower float 50, a plurality of ribs 52 are formed which extend in the vertical direction. Accordingly, the lower float 50 can move in the vertical direction within the cylinder 41 while the ribs 52 are brought into contact with and guided on the inner peripheral surface of the cylinder 41. Moreover, at the top of the lower float 50, a sealing protrusion 53 is formed. In addition, around the top of the lower float 50, the bottomed cylinder-shaped upper float 51 is held relatively movably in the vertical direction. In the middle of the upper float 51, a through valve hole 54 is formed so as to face the sealing protrusion 53.

The upper float 51 is held to the lower float 50 in such a manner that the bottom end faces upward. On the outer peripheral surface of the upper float 51, a plurality of engagement grooves 55 are formed, and engage with claws 56 which are formed on the opening end of the upper float 51. The engagement grooves 55 are formed vertically longer than the claws 56. Accordingly, the upper float 51 can move slightly relatively in the vertical direction with respect to the lower float 50. When the lower float 50 and upper float 51 move relatively in the direction approaching to each other, the sealing protrusion 53 of the lower float 50 closes the valve hole 54 to seal it.

On the top surface of the upper float 51, a valve body 57 is fixed by fitting, valve body 57 which is made of rubber. When the upper float 51 ascends accompanied by the ascending lower float valve 50, the valve body 57 contacts with the bottom-end surface of the evaporator opening 31 to seal it.

The shapes and apparent specific gravities of the lower float 50 and upper float 51 are designed so that their apparent specific gravities are smaller than that of fuels in order that the lower float 50 and upper float 51 can float on liquid fuels by the urging force of the spring 46. The spring 46 is held between the bottom end of the lower float 50 and the seat 40 of the lower case 4 in such a state that the spring 46 accumulates the urging force. However, the urging force is smaller than the sum of the weights of the lower float 50, upper float 51 and valve body 57. Accordingly, in air and fuel vapors, the lower float 50 presses the spring 46 by its own weight so that the bottom-end surface of the lower float 50 contacts with the seat 40 of the lower case 4.

The flow-out fuel inhibitor apparatus according to the present example is manufactured in the following manner, for instance. The double-floating valve 5 is first assembled. The assembled double-floating valve 5 is accommodated in the cylinder 41 of the lower case 4 together with the spring 46. Then, the upper case 3 is assembled with the lower case 4 temporarily by engaging the claws 45 of the lower case 4 with the periphery of the upper case 3. Thereafter, the flange 23 of the breather pipe 2 is fixed to the periphery of the upper case 3 in an airtight manner by welding by means of a laser welding method. Thus, the flange 44 of the lower case 4 is held between the upper case 3 and the breather pipe 2, and is thereby fixed firmly. Finally, the flange 23 of the breather pipe 2 is fixed at the periphery to the inner polyamide layer of the cover 1 by welding by means of a laser welding method. The resulting module is inserted into the top opening 301 of the fuel tank 300. Then, the outer acid-modified polyethylene resin layer existing at the periphery of the cover 1 is welded to the periphery of the top opening 301 of the fuel tank 300.

In the fuel tank 300 equipped with the thus constructed flow-out fuel inhibitor apparatus according to the present example, the summed weight of the double-floating valve 5 and spring 46 overcomes the urging force of the spring 46 when the level of the liquid fuel is below the bottom-end opening of the breather pipe 2 under steady ordinary circumstances. Accordingly, as illustrated in FIG. 1, a clearance is formed between the valve body 57 and the bottom-end surface of the evaporator opening 31. Therefore, the gas within the fuel tank 300 passes the through holes 42 to enter the upper case 3. Then, the gas passes the nipple 10 through the evaporator opening 31, and eventually flows into the canister. Thus, it is possible to inhibit the gas pressure within the fuel tank 300 from heightening.

On the other hand, when vehicles travel on roads with large irregularities, or when they travel on curved roads, the level of the liquid fuel waves greatly. Accordingly, even if the level of the liquid fuel is placed below positions at which the double-floating valve 5 floats under steady circumstances, the liquid fuel might enter the breather pipe 2 through the bottom-end opening of the breather pipe 2 or the minor-diameter through holes 22. However, in the flow-out fuel inhibitor apparatus according to the present example, the liquid fuel floats the double-floating valve 5 upward in such a case so that the valve body 57 closes the evaporator opening 31. Accordingly, the liquid fuel is inhibited from flowing into the canister. Moreover, even if the valve body 57 adheres to the evaporator opening 31, the double-floating valve 5 descends so that the lower float 51 detaches from the upper float 50 to open the valve hole 54. Consequently, the pressure within the breather pipe 2 is equalized with the pressure on the side of the nipple 10 communicating with the canister. As a result, the valve body 57 separates from the evaporator opening 31 with ease. Thus, the flow-out fuel inhibitor apparatus according to the present example is highly responsive when the level of the liquid fuel waves greatly, and is good in terms of the dynamic sealing property.

In addition, in supplying the liquid fuel, when the level of the liquid fuel within the fuel tank 300 is placed at positions below the end surface of the bottom-end opening of the breather pipe 2, the gas existing in the vapor phase within the fuel tank 300 flows into the breather pipe 2 through the bottom-end opening of the breather pipe 2 accompanied by the ascending level of the liquid fuel, and eventually flows to the canister. Therefore, the liquid fuel is kept to be supplied without increasing the pressure within the fuel tank 300.

Still further, in supplying the liquid fuel, when the level of the liquid fuel reaches the end surface of the bottom-end opening of the minor-diameter portion 21 of the breather pipe 2, the gas existing in the vapor phase within the fuel tank 300 flows into the breather pipe 2 through the through holes 22 alone. However, note that the through holes 22 are formed to have such a minor diameter that they exhibit a large ventilation resistance inherently. Accordingly, a differential pressure arises between the vapor phase within the fuel tank 300 and the vapor phase within the breather pipe 2 so that the liquid fuel is sucked into the breather pipe 2. Consequently, the double-floating valve 5 floats upward to close the evaporator opening 31. Thus, the gas within the fuel tank 300 loses the way out to heighten the vapor-phase pressure within the fuel tank 300. As a result, the fuel tank 300 is detected that it is filled up with the liquid fuel. Therefore, the flow-out fuel inhibitor apparatus according to the present example promotes to automatically turn off fuel supply guns.

However, the gas flows into the breather pipe 2 through the through holes 22 gradually. Thus, the vapor-phase pressure lowers, and accordingly the level of the liquid fuel descends within the breather pipe 2. As a result, the level of the liquid fuel descends in a filler pipe as well. Therefore, it is possible to supply the liquid fuel excessively. Moreover, even when the gas pressure within the fuel tank 300 increases abnormally, the gas existing in the vapor phase flows into the breather pipe 2 through the through holes 22 similarly. Hence, in this instance as well, it is possible to lower the pressure within the fuel tank 300.

As described above, the flow-out fuel inhibitor apparatus according to the present example is free of O-rings. Accordingly, it is possible to avoid the drawbacks resulting from the expansion of O-rings. Moreover, the upper case 3 is welded to the vicinity of the top-end opening of the breather pipe 2. Consequently, it is possible to obviate the dual structure set forth in Japanese Patent Application No. 2001-346,172 and eventually to downsize the flow-out fuel inhibitor apparatus. For the sake of reference, when the double-floating valve 5 of an identical outside diameter was employed, the outside diameter of the major-diameter portion 20 of the breather pipe 2 was $\phi$ 54 mm in the flow-out fuel inhibitor apparatus set forth in Japanese Patent Application No. 2001-346,172, whereas the outside diameter of the major-diameter portion 20 of the breather pipe 2 could be reduced to φ 46.5 mm in the flow-out fuel inhibitor apparatus according to the present example.

Moreover, in the flow-out fuel inhibitor apparatus according to the present example, the lower case 4 is held firmly between the upper case 3 and the breather pipe 2 at the top end. As a result, the lower case 4 hardly comes off even when excessive shocks are applied to the flow-out fuel inhibitor apparatus. Therefore, it is possible to inhibit such a drawback that the lower case 4 deviates axially to hinder the up-and-down movements of the double-floating valve 5.

Having now fully described the present invention, it will be apparent to one of ordinary skill in the art that many changes and modifications can be made thereto without departing from the spirit or scope of the present invention as set forth herein including the appended claims.

What is claimed is:

1. An apparatus for inhibiting fuels from flowing out of fuel tanks, the apparatus comprising:
   a cover having a communication passage communicating with a canister, disposed outside a fuel tank having a top opening, and fixed to a periphery of the top opening of the fuel tank in an airtight manner;
   a cylinder-shaped breather pipe disposed inside the fuel tank, extending downward, and having a top-end opening whose periphery is welded to the cover in an airtight manner;
   an upper case having a communication opening communicating with the communication passage of the cover, and welded to the breather pipe in an airtight manner at an outer periphery of the communication opening in the vicinity of the top-end opening of the breather pipe;
   a substantially box-shaped lower case disposed in the breather pipe, having a top end held to the upper case, and enabling a liquid fuel to pass through the inside and outside thereof; and
   a floating valve accommodated in a housing formed by the upper case and the lower case, floating on the liquid fuel, and moving up and down in accordance with the up-and-down movements of a level of the liquid fuel, whereby opening and closing the communication opening of the upper case, wherein the top-end opening of the breather pipe has a flange, the top end of the lower case is held between the upper case and the flange of the breather pipe, and claws are mounted on the top end of the lower case to be engaged with the periphery of the upper case.

2. The apparatus set forth in claim 1, wherein the cover is welded to the fuel tank.

3. The apparatus set forth in claim 2, wherein the fuel tank is formed of resin, and the cover has a surface, at least the surface welded to the fuel tank and formed of resin of the same material quality as that of the fuel tank.

4. The apparatus set forth in claim 1, wherein the breather pipe is formed of resin, and the cover has a surface, at least the surface welded to the breather pipe and formed of resin of the same material quality as that of the breather pipe.

5. The apparatus set forth in claim 1, wherein the cover has an inner periphery formed of resin of good moldability, and an outer periphery formed of resin weldable to the breather pipe.

6. The apparatus set forth in claim 1, wherein the breather pipe has an inside diameter at a bottom-end opening thereof at least, the inside diameter being smaller than that of the top-end opening.

7. The apparatus set forth in claim 1, wherein the breather pipe further has a differential valve member at the top-end opening, the differential valve member introducing a gas within the fuel tank into the breather pipe when a pressure within the fuel tank is abnormally high.

8. The apparatus set forth in claim 1, wherein the floating valve comprises a lower float and an upper float, a plurality of claws being formed on an opening end of the upper float, and a plurality of engagement grooves being formed on an outer peripheral surface of the upper float, the engagement grooves engaging with the claws.

9. The apparatus set forth in claim 1, wherein the floating valve comprises a lower float and an upper float, a sealing protrusion being formed at the top of the lower float, and a through valve hole being formed in the middle of the upper float so as to face the sealing protrusion, wherein a movement of the upper float and lower float approaching each other causes the sealing protrusion of the lower float to seal the valve hole in the upper float.

* * * * *